Sept. 22, 1953 W. OPAVSKY 2,652,596
PRODUCTION OF SEAMLESS HOLLOW RUBBER ARTICLES
Filed Feb. 17, 1951 2 Sheets-Sheet 1
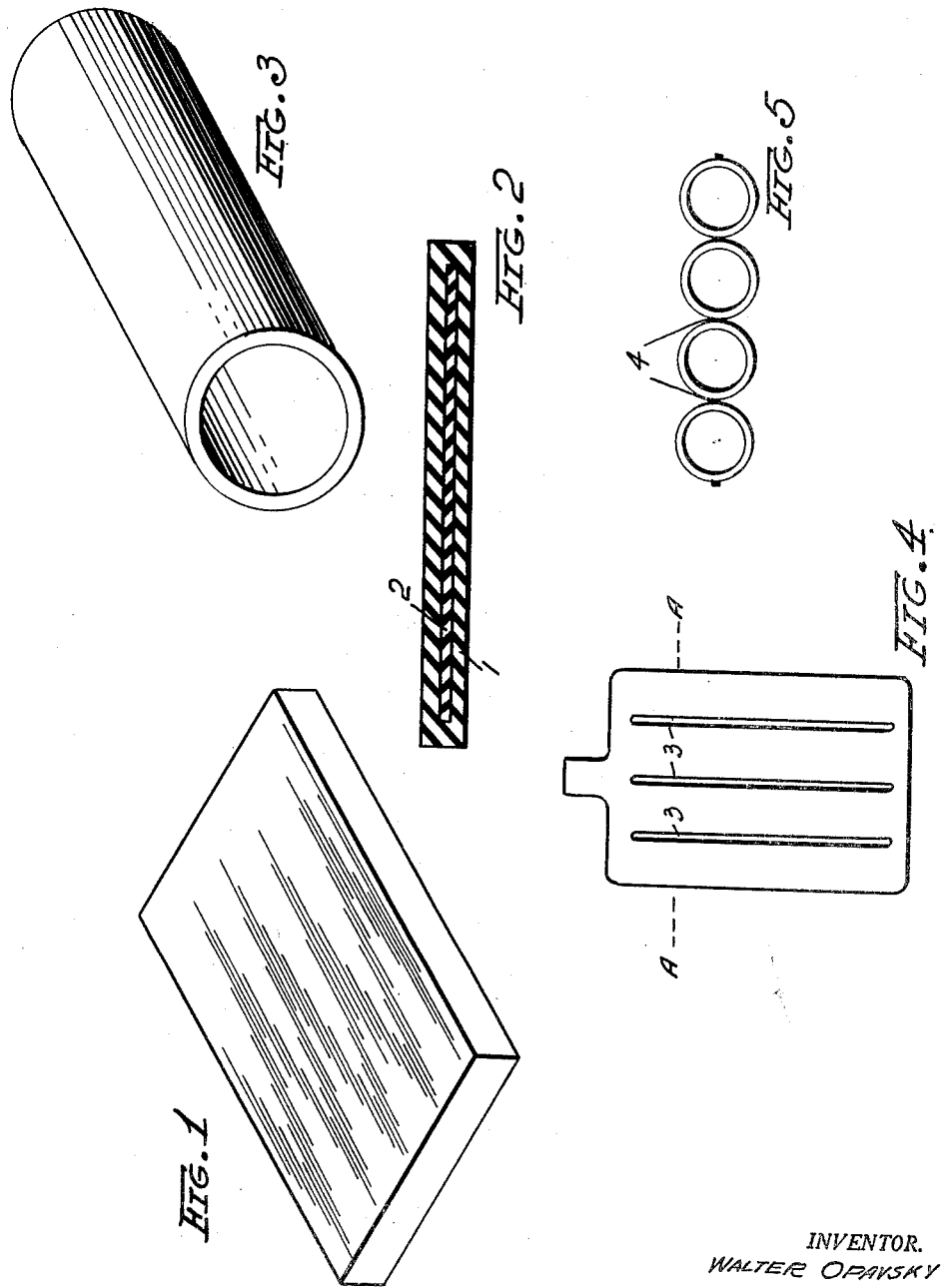
INVENTOR.
WALTER OPAVSKY
BY
AGENT

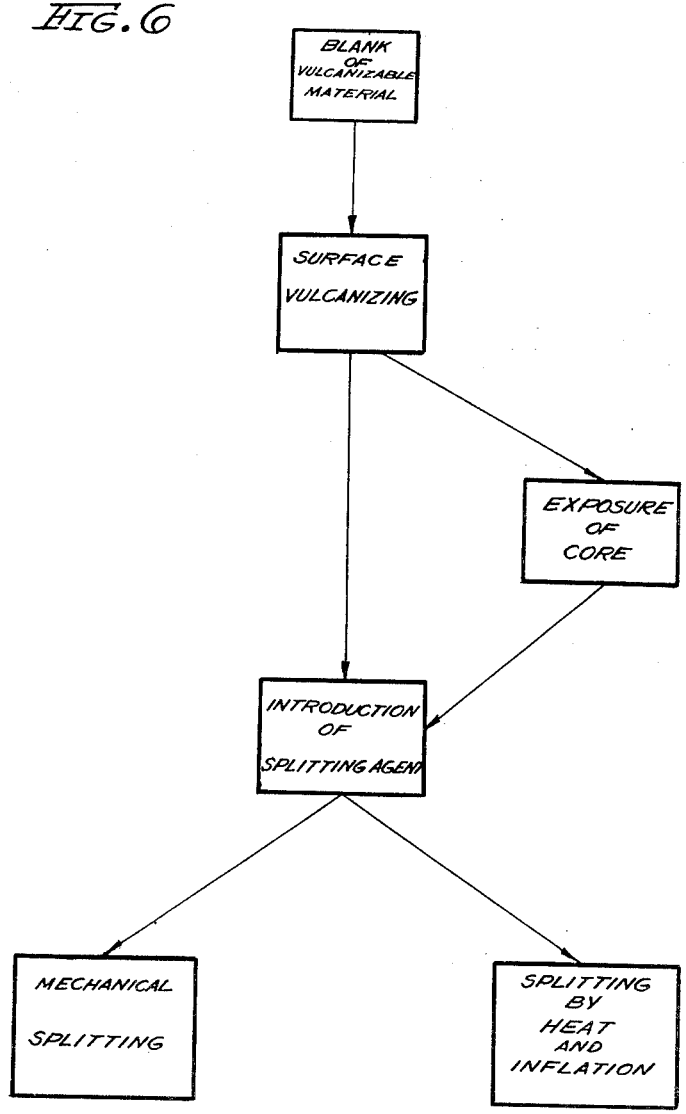

Patented Sept. 22, 1953

2,652,596

UNITED STATES PATENT OFFICE 2,652,596

PRODUCTION OF SEAMLESS HOLLOW RUBBER ARTICLES

Walter Opavsky, Coburg, Germany

Application February 17, 1951, Serial No. 211,501
In Germany March 10, 1950

22 Claims. (Cl. 18—47.5)

The invention relates to the manufacture of seamless hollow articles from rubber and similar vulcanizable substances.

It was proposed already, some time ago, to make hollow articles from cellulose derivatives by splitting up suitably shaped solid blanks. According to that known process, the strength of the solid cellulosic blanks was reduced from the outside towards the inside by partial saponification, e. g. with caustic soda, and by the simultaneous action of swelling agents; subsequently, the blanks were split up, whereby the connection between the edge layers was maintained. This method has, among others, the drawback that the partial saponification causes a chemical modification, for instance a depolymerization or deacetylation of the cellulose derivative. Thus, the saponification converts a cellulose acetate film more or less to a form of regenerated cellulose which has other properties than the starting material. A cellulose acetate tube or casing made by the process referred to is, in its whole structure, sensitive to water, and swells therein. Therefore, the known process for the preparation of seamless hollow articles from cellulose derivatives did not find commercial application.

It is a principal object of the present invention to provide a process for preparing seamless hollow articles from other materials than cellulose derivatives, particularly from natural or synthetic rubber or similar rubber-like substances.

Other objects and advantages will be apparent from a consideration of the specification and claims.

According to the invention, rubber blanks of any suitable shape and cross section are subjected to a curing treatment which is so controlled as to strengthen the outer surface layer by vulcanization and to decrease the vulcanization degree inwardly in such a way that the innermost core remains substantially uncured, i. e. in a state which allows of separating the cured strengthened layers while maintaining their edge connection.

The separation of the cured layers, which produces the seamless hollow structures, is preferably carried out or assisted by the use of solvents or swelling agents which are capable of converting the uncured core of the structures by their dissolving and/or swelling action into a condition readily permitting a proper separation of the cured layers.

Agents suitable for this purpose are hydrocarbons such as benzine, benzene, toluene, xylene, chlorinated hydrocarbons such as methylene chloride, chloroform, carbon tetrachloride, and others. Also lower aliphatic alcohols like methanol and ethanol may be used as splitting agents, either alone or in mixture with other agents. In some cases it has been found of advantage to apply mixtures of the recited splitting agents in form of particularly efficient mixtures.

Water may also be used to separate the cured layers.

The separation may be brought about by various manipulations, e. g. by mutual longitudinal displacement of the layers to be separated or by injecting air or other gases or liquids into the core zone, or by a combination of said steps. The splitting up may be assisted by heating the structures to suitable temperatures.

After the cured layers have been so separated as to leave their edges joined, I prefer to subject the obtained hollow structures to an after-treatment which converts the inner face or inner layer into the desired final state in which it is ensured against sticking. This after-treatment in its simplest form may be effected by vulcanization. In this way, the layer of uncured or only slightly cured rubber persisting on the inner wall of the hollow structure is on the one hand completely vulcanized and rendered unsticky, while, on the other hand, all the walls of the hollow structures are uniformly cured throughout.

The method of the invention will be set forth more in detail in the following description.

The sheets or foils used as starting material may be prepared by conventional methods, e. g. by calendering rubber or rubber mixes or by casting rubber latex or rubber solutions by means of a caster. In addition to vulcanizing agents such as sulfur or zinc oxide, the rubber blanks may contain other conventional additives, such as fillers and the like. If desired, also small amounts of vulcanization accelerators may be incorporated into the blanks. Generally, however, I prefer to bring accelerators into action only while carrying out the vulcanization, for instance by curing the structures in hot liquids containing vulcanization accelerators.

The sheets or foils are then cut into blanks of a form corresponding to the desired hollow article, for instance into strips, bands, discs, rings, and the like; the blanks may also have another cross section, other than rectangular, e. g. a circular cross section.

The vulcanization of said blanks may be carried out in baths which preferably contain conventional vulcanization accelerators. However, the vulcanization may also be obtained by other methods, e. g. by treating the blanks with gaseous sulfur chloride. The critical feature of the vulcanizing treatment consists in controlling the curing process so as to leave the innermost core of the blank uncured and thereby imparting to said core properties which are different from the properties of the cured layers enclosing said core layer.

I have found that the solvents used to act on the uncured core layer may be introduced into the interior of the blanks, so as to exert there the desired dissolving and/or swelling effects. Generally, the introduction of the solvent will be carried out subsequently to the vulcanizing treatment, for instance by dipping the structures into a bath containing the solvent or a mixture of the solvents to be incorporated. It is, however, also possible to introduce the solvent already during the vulcanization by heating the structures in a bath containing the solvent and, preferably, also vulcanization accelerators.

Experience has shown that the introduction of the solvents through the cured layers of the structures takes place without difficulties, even though the structures have been subjected to conventional dry vulcanization methods.

After a sufficient amount of the splitting agent has penetrated into the uncured core layer of the structure, the cured layers are readily forced apart by a gliding movement upon each other, for instance by passing the structure through squeezing rollers. Other methods of separation consist in subjecting the structures to a heat treatment, for instance in subjecting them to the action of hot air or steam or by a heating bath at a temperature which is higher than the boiling point of the splitting agent introduced inside the structure. The pressure of the vapor generated by the heating causes the structure to split up uniformly in the core zone.

As stated hereinbefore, also water may be used as a splitting agent. When the vulcanization of the rubber structures is obtained by heating the same in water or in an aqueous solution containing accelerators, small amounts of water diffuse into the structure; I have found that these amounts of water are sufficient, especially when the structures are subjected to a sudden rise of temperature, to effect by the pressure of the generated vapor the desired splitting up in the core zone.

In the accompanying drawings,

Fig. 1 is a perspective view of an uncured rubber blank used as starting material;

Fig. 2 is a view of the same blank in cross section after vulcanization of the outer layer and treatment of the core, and Fig. 3 shows the final tube obtained from the blank of Fig. 2 by removing the core, inflating the outer layers, and curing;

Fig. 4 is a plan view of another blank;

Fig. 5 is a diagrammatic cross section along line A—A of Fig. 4, showing the air cushion prepared from said blank;

Fig. 6 is a flow sheet showing the essential steps of my process.

In the drawings, the numeral 1 designates the cured outer layers and 2 is the substantially uncured core, which is treated as more fully explained in the following examples which are given to illustrate the process of the invention and are not to be considered as limiting the invention.

*Example 1*

A rubber plate or sheet of about 1 mm. thickness containing vulcanizing agents is first treated for about 20 min. at 90° C. in a water bath containing vulcanization accelerators and then rinsed in water and wiped or dried. Subsequently the plate is placed for about 10 min. in methylene chloride and afterwards abruptly heated by passing it into a heating zone maintained at a temperature of about 80 to 100° C., thereby causing on the surface of the rubber plate a rapid drying and evaporation of the methylene chloride present in the surface layer, while in the interior of the plate splitting up in the core zone and inflation by the vapor pressure to a hoselike structure takes place.

*Example 2*

Strips are cut or punched out of rolled rubber foil of about .5 mm. thickness containing vulcanization agents. The width of the strips is made conforming to the desired diameter of the cylindrical structures to be obtained. The strips are placed in a water bath heated to about 80° C., in which 2 per cent of hexamethylene tetramine are dissolved, and allowed to remain in the bath for about 12 min. Then the superficially cured strips are held in a bath composed of 80 parts of benzene and 20 parts of toluene for about 8 min. During this time, the solvent mixture has penetrated into the foil in an amount sufficient to allow of separating the foil lengthwise along its center. The simplest way to bring about such separation is a treatment by which the layers to be separated are displaced with respect to each other, for instance by passing the structures through squeezing rollers. Another method of separation consists, for instance, in subjecting the structures to a hot air or steam treatment at a temperature which is above the boiling point of the incorporated solvent. The hollow article thus obtained is then subjected to a vulcanizing treatment by which the inner surface, or the inner and middle layers, are converted to the same state as the outer layer. This vulcanization may be carried out according to conventional methods, for instance by a heat treatment or in a vulcanizing bath.

*Example 3*

A rubber solution is prepared by dissolving rubber in a solvent such as benzene, toluene, xylene, methylene chloride, trichloroethylene, cyclohexane, carbon tetrachloride and adding 2 per cent of sulphur and 4 per cent of zinc oxide (calculated on the rubber used), and the solution is poured out to a foil of .5 mm. thickness. After evaporation of the solvent, a blank of desired shape, for instance a circular blank with a handle-like extension is cut out of the foil. The circular blank is kept at 100° C. for 20 min. in a heating chamber and then dipped in a solvent, e. g. methylene chloride, for 10 min. The separation of the upper and lower layer and the after-treatment may be carried out as described in Example 1. By inflating the structure a seamless bladder is obtained which may be used for balloons or as a football bladder.

*Example 4*

A round rubber string or cord of 5 mm. diameter made by extrusion and containing sulphur and zinc oxide as vulcanizing agents is subjected for about 20 min. to the action of a bath which consists of 80 parts of benzene, 10 parts of benzine and 10 parts of tetramethylthiouramsulfide and which is heated to 80° C. The string is cured to an inwardly decreasing degree whereby the central core remains unaffected. Subsequently the string is passed through two revolving pressure rolls and continuously squeezed; in this way, the uncured core in liquid form is squeezed out of the seamless sleeve. The hollow structure thus obtained may be converted by vulcanization into the uniform finished hollow article. In the same or similar manner blanks of other profiles may be processed to hollow articles.

The described method may be carried out in the presence of assisting agents which are adapted to influence the occurring reactions in a desired manner. The hollow structures may be treated, for instance, prior to their final vulcanization with agents imparting certain desired properties, e. g. by washing them with suitable liquids. In general, such assistants are not necessary.

In another modification of my invention I omit the introduction of organic solvents or swelling agents through the cured layers into the core of the structures and avail myself of the fact that the inner uncured core presents essential differences from the cured sleeve wherein said core is embedded. The uncured core layer, for instance, has a substantially lower softening point than the cured sleeve. Therefore, the uncured material changes its form without mechanical load already at temperatures of about 160° to 180° C., whereas the same cured material is subject to such changes without mechanical load only at temperatures of 220° to 240° C.

According to this modification, the process of the invention may be carried out in such a way that the vulcanized blank, e. g. a rubber strip in form of a band or ribbon is cut off at one end, whereby the uncured core layer is exposed. At this place a cavity is formed which renders it possible to introduce a gas or gas mixture, for instance air. The formation of the cavity may be brought about for instance by the action of swelling agents or solvents for the uncured core layer, such as by introducing the end of the strip into benzine, benzene, chloroform, methylene chloride, or the like. In this way, the uncured core layer of the end portion introduced into the solvent is swollen and more or less dissolved so that the splitting and separation of the cured sleeve may be brought about by mechanical operations such as mutual displacement of the opposite surfaces. The splitting and separating operation may be assisted by subjecting the end of the rubber band, after briefly dipping it into the solvent, to a short, preferably abrupt heat treatment, by which the solvent diffused into the core is vaporized, and a quick further dissolution of the uncured core layer is effected with expansion of the cured sleeve. I prefer to use a solvent which furnishes already at relatively low temperatures by evaporation a large gas volume e. g. methylene chloride. The splitting agent, e. g. air or a suitable liquid like toluene or xylene, or even water is introduced into the cavity thus formed and the point of admission is then closed. Then the structure is subjected to a heat treatment at a temperature at which the uncured core is softened but the cured sleeve is not affected. This heat treatment may be carried e. g. in the temperature range of 160° to 200° C., preferably at 160° to 180° C.

The expansion of the splitting agent under the influence of the heat coacts with the heat-softening of the uncured core to accomplish the desired splitting in the core zone of the structure. This operation may be assisted by charging the gas to be introduced in the cavity with a solvent for the uncured core, which may be done in the simplest way, e. g. by agitating the solvent with the gas. Also other substances having a favorable effect as for instance vulcanization accelerators may be simultaneously introduced in this way into the core zone. In this manner it is possible to carry out the splitting of the structures and the complete vulcanization of their inner surfaces in a single operation.

The heat treatments of the structures according to the invention may be carried out in heating chambers or in heating liquids (baths). A preferred embodiment consists in heating by means of heat generating radiation, e. g. with infrared or high frequency radiation. In this way, the cured walls of the structures are not affected, whereas the core is heated up more quickly.

*Example 5*

A band-shaped blank of rubber or of a usual rubber mix containing vulcanizing agents is placed in a vulcanizing bath containing vulcanization accelerators and so cured as to leave an unaffected thin core layer, the thickness of which is e. g. about one tenth of the thickness of the blank. The band thus treated is cut off at one end, thereby exposing the uncurred core at the slit face. This end is subjected in a length of e. g. 5 to 10 cm. to a treatment which forms a cavity for the introduction of the splitting agent. The end may, for instance, be dipped for a short time in methylene chloride and the thus softened uncured core layer may be removed for the formation of a cavity. Subsequently, air, or a liquid, for instance toluene, is introduced in said cavity, the cut is carefully closed, for instance by means of a clamp, and the structure is heated to about 160 to 180° C. The splitting agent penetrates into the core zone softened by the action of the heat and effects the desired splitting with formation of a seamless hollow structure.

If not strip-shaped but circular, elliptical or other blanks are used. I prefer to provide narrow strip-shaped extensions of a length of about 5 to 10 cm. and to convert said extensions after the preliminary vulcanization of the blanks into hollow structures in the manner set forth hereinbefore. These hollowed extensions are then used to receive the gaseous or liquid splitting agent required for forcing apart the cured walls of the blank proper. In certain hollow structures, for instance in air pillows or annular invalid cushions, such extensions are necessary to provide an opening and closing means. In the manufacture, for instance of rubber toy animals, the extension strip for the introduction of the splitting agent may be formed by a leg, ear or the like part of the finished animal itself. In other cases, the extensions may be removed after they have fulfilled their purpose.

Figs. 4 and 5 illustrate a hollow structure in form of an air cushion which consists of hollow compartments partially separated by partitions 4. These partitions are obtained by providing in the blank longitudinally extending areas, e. g. grooves, of reduced thickness 3, which areas are completely cured in the first vulcanizing step and are, therefore, not split in the center as are the areas of the thicker sections which form the air compartments of the finished cushion.

The blanks may be further modified by arranging therein, at suitable places, holes of suitable form and diameter which will appear at the corresponding places in the finished hollow article and may be used to receive supporting means and for other purposes.

The flow sheet of Fig. 6 illustrates in compressed form the various phases of my process as set forth in the foregoing description. The rubber blanks—the term "rubber" being used to designated any vulcanizable composition—are subjected to a vulcanization leaving an uncured core. A softening and/or splitting agent is introduced into the uncured core, either immediately following or even together with, the vulcanization or after partial exposure of the core; after said agent has at least partially penetrated the core layer, the blank is "split up" in the core area either by a mechanical squeezing action or by a heat treatment preferably in combination with the inflating action of gases developed in the core area. Several of these splitting operations may be combined. Subsequently, the obtained hollow structure may be completely vulcanized to remove any tackiness of the inner surfaces.

Although I have described my invention, setting forth specific embodiments thereof, my invention is not limited to the details described above. It will be understood to those skilled in the art that the process is susceptible of considerable variations and my invention is not to be limited except by the scope of the claims appended hereto.

What I claim is:

1. Process for the production of seamless hollow structures comprising the steps of subjecting a solid blank of vulcanizable material to a vulcanizing treatment completely curing said blank except the innermost core thereof, and splitting the blank in said inner uncured core, thereby converting said blank to a seamless hollow structure.

2. Process for the production of seamless hollow structures comprising the steps of subjecting a solid blank of vulcanizable material to a vulcanizing treatment completely curing said blank except the innermost core thereof, and moving the cured walls upon each other, thereby separating walls along the uncured core and forming a seamless hollow structure.

3. Process for the production of seamless hollow structures comprising the steps of subjecting a solid blank of vulcanizable material to a vulcanizing treatment completely curing said blank except the innermost core thereof, introducing a liquid into said uncured core, heating the blank quickly to a temperature above the boiling point of said liquid, and forcing apart the cured walls of the blank by the pressure of vaporized liquid expanding in said uncured core, thereby converting said blank to a seamless hollow structure.

4. Process for the production of seamless hollow structures comprising the steps of subjecting a solid blank of vulcanizable material to a vulcanizing treatment completely curing said blank except the innermost core thereof, and injecting gases into said uncured core, thereby separating the cured walls of the blank and forming a seamless hollow structure.

5. Process for the production of seamless hollow structures comprising the steps of subjecting a solid blank of vulcanizable material to a vulcanizing treatment completely curing said blank except the innermost core thereof, and introducing into said uncured core liquids suitable to cause a separation of the cured walls of the blank.

6. A process as defined in claim 5, wherein said liquids are introduced into the uncured core by diffusion through the cured outer walls.

7. A process as defined in claim 1, wherein the vulcanizing treatment is carried out in a solution containing splitting agents capable of diffusing through the cured walls of the blank into the inner core.

8. Process for the production of seamless hollow structures comprising the steps of subjecting a solid blank of vulcanizable material to a vulcanizing treatment completely curing said blank except the innermost core thereof, heating said blank, and splitting the heated blank in said inner uncured core, thereby converting the blank to a seamless hollow structure.

9. Process for the production of seamless tubes or casings comprising the steps of subjecting a vulcanizable composition in the form of a blank of circular cross-section to a vulcanizing treatment completely curing said blank except the innermost core placing said blank into a solvent for uncured rubber for a time sufficient to dissolve said innermost core, cutting the blank, and squeezing out the dissolved core, thereby leaving the blank in the form of a seamless hollow tube.

10. Process for the production of seamless hollow structures comprising the steps of subjecting a solid blank of vulcanizable material to a vulcanizing treatment completely curing said blank except the innermost core thereof, introducing a splitting agent directly in the uncured core, and separating the cured surface layers from said uncured core, thereby producing a seamless hollow article.

11. Process for the production of seamless hollow articles comprising the steps of subjecting a solid blank of vulcanizable material to a vulcanizing treatment completely curing said blank except the innermost core, cutting said blank through so as to expose a portion of the uncured core, producing a cavity in said exposed portion, introducing a splitting agent in said cavity, closing said cavity, heating the blank to a temperature softening the core but not affecting the cured walls of the blank, and separating said cured walls of the blank from the softened core, thereby obtaining said blank in form of a seamless hollow structure.

12. A process as defined in claim 11 wherein the splitting agent introduced in the cavity is a gas.

13. A process as defined in claim 12 wherein the gas is charged with a solvent for the uncured core.

14. A process as defined in claim 11 wherein a liquid splitting agent is used.

15. Process for the production of seamless hollow structures comprising the steps of forming from vulcanizable material solid blanks of curved cross section provided with strip-like extensions, vulcanizing said blanks so as to leave a substantially uncured core inside said blanks, producing a cavity in the core of said extension, introducing a volatile solvent for the uncured core into said cavity, closing said cavity and heating said blank above the boiling point of said solvent, thereby forcing apart the cured walls of the blank and producing a seamless hollow structure.

16. Process for the production of seamless hollow articles comprising the steps of subjecting a solid blank of vulcanizable material to a vulcanizing treatment completely curing said blank except the innermost core thereof, cutting off a part of the blank so as to expose a portion of the uncured core, dissolving out a portion of said exposed core to form a cavity, introducing a fluid into said cavity, closing said cavity, and heating the blank to a temperature generating a pressure of the fluid sufficient to force apart the cured walls of the blank so as to form a seamless hollow structure.

17. Process for the production of seamless hollow articles comprising the steps of subjecting a solid blank of vulcanizable material to a vulcanizing treatment completely curing said blank except the innermost core thereof, cutting off a part of the blank so as to expose a portion of the uncured core, dissolving out a portion of said exposed core to form a cavity, introducing a fluid into said cavity, closing said cavity, and heating the blank to a temperature of 160–200° C.

18. A process as defined in claim 1, wherein the blank after splitting is subjected to a vulcanizing after treatment, curing the inner surfaces of the obtained hollow structure.

19. A process as defined in claim 5 wherein the introduced liquid is a low boiling organic solvent for the uncured core.

20. Process for the production of seamless hollow structures comprising the steps of subjecting a solid blank of vulcanizable material to a vulcanizing treatment completely curing said blank except the innermost core thereof, introducing into said uncured core a volatile liquid and a vulcanization accelerator, and heating the blank to vulcanization temperature, thereby forcing apart, by the generated vapor of the liquid, the previously cured walls to form a hollow seamless structure, and simultaneously curing the inner surfaces of said structure.

21. Process for the production of seamless hollow structures comprising the steps of vulcanizing a solid blank of vulcanizable material, stopping the vulcanization when the blank is almost completely cured and only an innermost core of about one-tenth of the total thickness of the blank remains uncured, and splitting the blank in said uncured core, thereby converting said blank to a seamless hollow structure.

22. Process for the production of seamless hollow articles comprising the steps of subjecting a solid blank of vulcanizable material to a vulcanizing treatment completely curing said blank except the innermost core thereof, partially removing the vulcanized surface layer so as to expose a portion of said uncured core, producing a cavity in said exposed portion, introducing a splitting agent in said cavity, closing said cavity, heating the blank to a temperature softening the core but not affecting the cured walls of the blank, and separating said cured walls of the blank from the softened core, thereby obtaining said blank in the form of a seamless hollow structure.

WALTER OPAVSKY.

References Cited in the file of this patent

UNITED STATES PATENTS

| Number | Name | Date |
|---|---|---|
| 1,152,837 | Price | Sept. 7, 1915 |
| 2,345,144 | Opavsky | Mar. 28, 1944 |
| 2,397,340 | Dahle | Mar. 26, 1946 |